(12) United States Patent
Horesh et al.

(10) Patent No.: US 10,417,116 B2
(45) Date of Patent: Sep. 17, 2019

(54) SYSTEM, METHOD, AND APPARATUS FOR CROWD-SOURCED GATHERING OF APPLICATION EXECUTION EVENTS FOR AUTOMATIC APPLICATION TESTING AND REPLAY

(71) Applicant: International Business Machines Corporation, Armonk, NY (US)

(72) Inventors: Lior Horesh, North Salem, NY (US); Raya Horesh, Weschester, NY (US); Marco Pistoia, Weschester, NY (US); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 15/222,067

(22) Filed: Jul. 28, 2016

(65) Prior Publication Data

US 2018/0032424 A1 Feb. 1, 2018

(51) Int. Cl.
*G06F 9/44* (2018.01)
*G06F 11/36* (2006.01)
*G06F 8/65* (2018.01)

(52) U.S. Cl.
CPC ............ *G06F 11/3684* (2013.01); *G06F 8/65* (2013.01)

(58) Field of Classification Search
None
See application file for complete search history.

(56) References Cited

U.S. PATENT DOCUMENTS

| 6,182,245 | B1 | | 1/2001 | Akin et al. |
| 7,167,870 | B2 | * | 1/2007 | Avvari ............... G06F 11/3676 707/609 |
| 7,490,319 | B2 | * | 2/2009 | Blackwell .......... G06F 11/3664 717/124 |

(Continued)

FOREIGN PATENT DOCUMENTS

| CN | 102346709 A | 2/2012 |
| CN | 105446868 A | 3/2016 |

OTHER PUBLICATIONS

Armaly et al., Reusable Execution Replay: Execution Record and Replay for Source Code Reuse, ACM, Jun. 7, 2014.*

(Continued)

*Primary Examiner* — Insun Kang
(74) *Attorney, Agent, or Firm* — Scully, Scott, Murphy & Presser, P.C.; Daniel P. Morris, Esq.

(57) ABSTRACT

A method is disclosed including instrumenting a first version of an application on a plurality of end user devices and receiving execution data for the first version of the application from at least some of the plurality of end user devices. The execution data may be generated by the instrumentation in response to an execution of the first version of the application by the at least some of the end user devices. The method further includes automatically generating execution scripts based on the received execution data. The execution scripts may be configured to reproduce the execution of the first version of the application by the at least some of the end users devices. The method further includes automatically executing at least one of the execution scripts on an updated version of the application.

13 Claims, 3 Drawing Sheets

(56) References Cited

U.S. PATENT DOCUMENTS

| | | | | |
|---|---|---|---|---|
| 7,506,318 B1* | 3/2009 | Lindo | | G06F 11/3644 |
| | | | | 717/130 |
| 8,099,720 B2* | 1/2012 | Sedukhin | | G06F 8/10 |
| | | | | 717/104 |
| 2002/0087949 A1* | 7/2002 | Golender | | G06F 9/547 |
| | | | | 717/124 |
| 2005/0028146 A1* | 2/2005 | Quick | | G06F 11/3688 |
| | | | | 717/130 |
| 2005/0166094 A1* | 7/2005 | Blackwell | | G06F 11/3664 |
| | | | | 714/38.14 |
| 2007/0050678 A1* | 3/2007 | Estes | | G06F 11/0748 |
| | | | | 714/38.1 |
| 2008/0098003 A1 | 4/2008 | Dias et al. | | |
| 2008/0177554 A1* | 7/2008 | Srinivasan | | G06F 8/76 |
| | | | | 717/100 |
| 2009/0049427 A1* | 2/2009 | Zhao | | G06F 9/4448 |
| | | | | 717/127 |
| 2009/0158249 A1* | 6/2009 | Tomkins | | G06F 11/3696 |
| | | | | 717/107 |
| 2010/0138811 A1* | 6/2010 | Jayaraman | | G06F 11/3466 |
| | | | | 717/125 |
| 2011/0145641 A1* | 6/2011 | Evans | | G06F 11/3688 |
| | | | | 714/27 |
| 2011/0185348 A1* | 7/2011 | Cordesse | | G06F 9/44536 |
| | | | | 717/170 |
| 2011/0320880 A1* | 12/2011 | Wenig | | G06F 11/3414 |
| | | | | 714/39 |
| 2012/0030658 A1* | 2/2012 | Hu | | G06F 11/3688 |
| | | | | 717/131 |
| 2013/0067298 A1* | 3/2013 | Li | | G06F 11/3688 |
| | | | | 714/799 |
| 2014/0013307 A1* | 1/2014 | Hansson | | G06F 11/3692 |
| | | | | 717/124 |
| 2014/0245268 A1* | 8/2014 | Golender | | G06F 11/3636 |
| | | | | 717/128 |
| 2014/0337819 A1* | 11/2014 | Fahndrich | | G06F 11/3608 |
| | | | | 717/122 |
| 2015/0019706 A1* | 1/2015 | Raghunathan | | G06F 11/3664 |
| | | | | 709/224 |
| 2015/0046909 A1* | 2/2015 | Ligman | | G06F 11/3688 |
| | | | | 717/131 |
| 2015/0181447 A1 | 6/2015 | Zhao et al. | | |
| 2015/0242280 A1* | 8/2015 | Busaba | | G06F 11/1407 |
| | | | | 714/13 |
| 2015/0286559 A1 | 10/2015 | Hu et al. | | |
| 2016/0019043 A1* | 1/2016 | Ramasamy | | G06F 8/67 |
| | | | | 717/171 |
| 2016/0103756 A1* | 4/2016 | McClung | | G06F 11/3612 |
| | | | | 714/38.1 |
| 2016/0132415 A1* | 5/2016 | Dillard | | G06F 11/263 |
| | | | | 714/33 |
| 2016/0197974 A1* | 7/2016 | Lee | | G06F 3/1454 |
| | | | | 709/219 |
| 2016/0259714 A1* | 9/2016 | Shor | | G06F 11/3676 |
| 2016/0274997 A1* | 9/2016 | Kachko | | G06F 11/366 |
| 2016/0306612 A1* | 10/2016 | Hewitt | | G06F 8/33 |
| 2016/0306627 A1* | 10/2016 | Hewitt | | G06F 8/33 |
| 2016/0335172 A1* | 11/2016 | Smith | | G06F 11/3644 |
| 2017/0039132 A1* | 2/2017 | Bates | | G06F 11/3688 |
| 2018/0052725 A1* | 2/2018 | Hannson | | G06F 11/368 |

OTHER PUBLICATIONS

Bakshy et al., Designing and Deploying Online Field Experiments, ACM, 2014.*
Gomez et al., Reproducing Context-sensitive Crashes in Mobile Apps using Crowdsourced Debugging, HAL-Inria, 2015.*
International Search Report dated Sep. 27, 2017 issued in PCT/IB2017/053725, 11 pages.

* cited by examiner

SYSTEM, METHOD, AND APPARATUS FOR CROWD-SOURCED GATHERING OF APPLICATION EXECUTION EVENTS FOR AUTOMATIC APPLICATION TESTING AND REPLAY

FIELD

The present application relates generally to automated application testing.

BACKGROUND

Software application development is a very dynamic process. Development typically requires a number of steps including the generation of ideas, coding, and testing. In the past, development would often take years to produce an application and months for each update. With the advent of mobile computing, developers are now able to generate updates at a much faster pace, for example, in days or weeks as opposed to months or years. Such an increased pace also requires an increased pace of testing.

BRIEF SUMMARY

The methods, systems, and computer program products disclosed herein provide ways to dynamically automate application testing based on real-life execution data collected from actual use of the application by end users.

In an aspect of the present disclosure, a method is disclosed including instrumenting a first version of an application on a plurality of end user devices and receiving execution data for the first version of the application from at least some of the plurality of end user devices. The execution data may be generated by the instrumentation in response to an execution of the first version of the application by the at least some of the end user devices. The method further includes automatically generating execution scripts based on the received execution data. The execution scripts may be configured to reproduce the execution of the first version of the application by the at least some of the end users devices. The method further includes automatically executing at least one of the execution scripts on an updated version of the application.

In aspects of the present disclosure apparatus, systems, and computer program products in accordance with the above aspect may also be provided.

Further features as well as the structure and operation of various embodiments are described in detail below with reference to the accompanying drawings. In the drawings, like reference numbers indicate identical or functionally similar elements.

DETAILED DESCRIPTION

When developing a software application, a developer often needs to confirm that the application reliably functions in a desired manner. The developer may utilize various testing methods to obtain an assurance that the application will function as intended with as high a degree of certainty as possible. For example, a developer may run a testing suite that attempts to test as many paths of execution as possible. The testing suite may be prepared prior to coding of the software application or update based on system or software specifications, concurrently with the coding of the software application or update, or after the coding of the software application or update. Often the testing suite is prepared by programmers in a similar manner to the software application itself and may require many man-hours of labor. The testing suite is then applied to the application in a controlled testing environment.

The quality of the testing suite, e.g., the level of confidence that the testing suite provides, may be directly influenced by factors such as budget, time, available resources (programmers, test units, processing power, etc.), and other similar constraints. Thus developers must weigh the cost in time, budget, and resources against the desired level of confidence that the software application will perform as intended. Even when large amounts of time, budget, and resources are applied to testing a software application, however, there is still no guarantee that a testing suite has exhaustively traversed all the possible paths of execution of the software application or that a sufficient number of input combinations have been used in order to verify the absence of errors.

The methods, systems, and computer program products disclosed herein provide ways to dynamically automate application testing based on real-life execution data collected from actual use of the application by end users.

Figure 1:
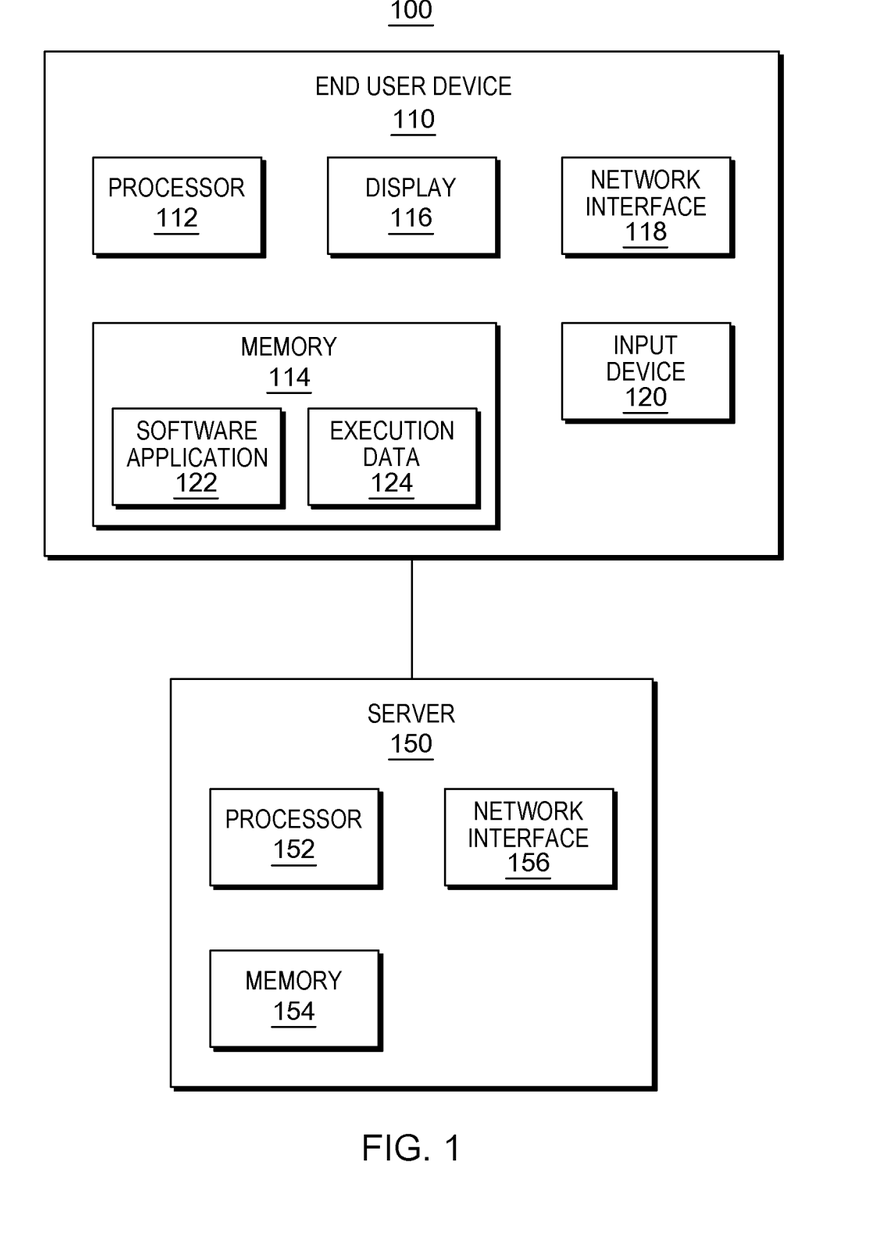
FIG. 1 is a system diagram of a system for dynamically automating application testing in accordance with an aspect of the present disclosure.

Referring to FIG. 1, a system 100 for dynamically providing automated application testing is disclosed. System 100 may include, for example, end user devices 110 and one or more servers 150. End user device 110 may include, for example, at least one processor 112, memory 114, a display 116, a network interface 118, an input device 120, and any other feature commonly found in an end user device. End user device 110 may include, for example, personal computers, tablets, laptops, mobile devices, smart phones, smart watches, smart wearable devices, or other similar computing devices.

Memory 114 may include instructions, software, and/or programs that may be executed by processor 112. In some aspects, memory 114 may include software applications 122 that may be implemented by end user device 110.

Display 116 is configured to visually convey information to a user of an end user device 110. Display 116 may include, for example, computer displays, television displays, smart device displays, smart phone displays, smart watch displays, projectors, a virtual reality headset display, or any other display or screen capable of visually presenting information to a user. In some aspects, display 116 may also function as an input device 120. For example, display 116 may include a touch screen.

Network interface 118 may be configured to communicate with server 150, another computing device, the internet, the cloud, or any other device, via wired or wireless technology. For example, network interface 118 may communicate with network interface 156 of server 150.

Input device 120 may include a mouse, keyboard, gamepad, touch screen, button, or any other input device that provides an end user with the capability to interact with end user device 110.

Although the processor 112, memory 114, display 116, network interface 118, and input device 120 are described in the context of a single end user device 110, one or more of these components may also or alternatively be provided in one or more separate or additional end user devices 110.

Server 150 may include at least one processor 152, memory 154, a network interface 156, and any other feature commonly found in a server. Memory 154 may store one or more versions of software application 122. For example, memory 154 may store a current version of software application 122 as installed on end user devices 110 and may also store an updated version of software application 122 for application testing of the update. In some aspects, the updated version of software application 122 may be provided to the end user devices 110 by server 150 before, during, or after testing of the updated version is complete.

Application Instrumentation

In some aspects, the collection of execution data 124 from an application 122 may be performed by instrumenting the application 122 on the end user device 110. For example, applications 122 may be instrumented by injecting instrumentation into the executable code of the application 122 without the need for editing the source code. Any application 122 may be instrumented, with or without the source code. This may be especially important on proprietary operating systems where, for example, access to the source code may not be available.

Depending on the operating system on which application 122 is run, different methods of instrumentation may be used. For example, on an Android® based operating system, a custom class loader may be used. At run time, the custom class loader may load specialized versions of classes of the operating system's application program interface (API) that are used by the software application. The specialized versions of the classes may be loaded instead of the original versions of the classes included in the API. For example, every time the application 122 makes a call to a class of the operating system's API, the specialized version of that class may be loaded instead of the original version. The specialized version includes additional code for tracking and logging execution data 124 about the application 122. For example, the specialized version may track and log any inputs that are used by the application 122, the execution paths caused by the inputs, any environmental condition that may affect the function of the application 122, and other similar execution data 124 about the application 122. The tracked and logged execution data 124 may be stored locally in memory 114, uploaded to server 150 for storage in memory 154, and/or stored in any other location for later use. The specialized version of the operating system API may also call the original version of the operating system's API or may perform the same operation that the original version would have performed such that the semantics of the application 122 are not broken.

As another example, on the iOS operating system, where class loading injection is not an option, a special feature of the Objective-C and Swift programming languages called method swizzling may be used. Method swizzling allows instrumentation access by redirecting a method call to an alternative method, e.g., for logging purposes, and then redirecting the call back to the original method that would have been called otherwise. The alternative method may track and log execution data 124 about the application 122. For example, the alternative method may track and log any inputs that are used by the application 122, the execution paths caused by the inputs, any environmental condition that may affect the function of the application 122, and other similar execution data 124 about the application 122. The tracked and logged execution data 124 may be stored locally in memory 114, uploaded to server 150 for storage in memory 154, and/or stored in any other location for later use.

Both of the above methods of instrumentation do not require source-code editing and may be carried through even by a party other than the developer of the application 122. Therefore, even applications 122 that are no longer under development may be instrumented. For example, legacy applications 122, applications 122 made by developers that are no longer in business, and other similar applications 122 where the source code is no longer available may be instrumented.

Automatic Data Collection

Execution data 124 from the software application may be collected via the application instrumentation at run time. Execution data 124 may include deterministic events, e.g., user inputs and user interactions with a user interface or other parts of the application. Execution data 124 may also include non-deterministic or environmental events, for example, e.g., a battery level of the device, a network connectivity type and strength, a location of the user, and other non-deterministic or environmental events. In some aspects, the execution data 124 from the application 122 may be collected from an arbitrarily large group of end user devices 110. For example, if an arbitrary number of end user devices 110 have downloaded and installed the application 122, execution data 124 for some or all of the arbitrary number of end user devices 110 may be collected. As a non-limiting example, if five hundred end user devices 110 have downloaded and installed the application 122, execution data 124 for some or all of the five hundred end user device 110 may be collected. In some aspects, execution data 124 may be collected from any other number of end user devices 110. In general, as the number of end user devices 110 that execution data 124 is collected from increases, the chance that an execution path in the application 122 has not been reached by at least one of those end user devices 110 is reduced. For example, if execution data 124 is collected from a sufficiently large group of end user devices 110, the system is virtually guaranteed to collect execution data 124 for every relevant data input, environmental condition, and execution path of the application 122. The sufficiency of the size of the group of end user devices 110 may depend on a variety of factors including, for example, number of inputs, number of lines of code, number of execution paths, or other similar factors. In some aspects, execution data 124 may be collected over an arbitrary amount of time from each end user device 110. For example, execution data 124 may be collected each time an end user device 110 implements the application 122. Over time, the volume of execution data 124 collected from that end user device 110 may increase. As the volume of execution data 124 collected from each end user device 110 increases, the chance that an execution path in the application 122 has not been reached by the end user device 110 is reduced.

Automatic Generation of Application Execution Scripts

The execution data 124 collected from the group of users may be used to generate execution scripts that can later be run to replay the actual real-life use of the application 122. The generated scripts may, for example, follow the different paths of execution through the application 122 that the end user devices 110 have undertaken using the inputs, environment settings, etc., actually used by the end user device 110. The execution scripts mirror the group of end users' execution of the application under different environmental conditions, different inputs, and different execution paths. In some aspects, the execution scripts may be generated by server 150.

Automatic Replaying of Applications

The generated execution scripts may be automatically executed by the system 100 to test an updated version of application 122 by replaying actual end user use of application 122. For example, the commands in an execution script may correspond to execution events of the application 122 during execution by an end user device 110 as collected in the execution data 124. The execution script may be run on an updated version of application 122 to mimic the execution events, for example, using the same inputs and environment that were used by the application 122 during the execution on the user device 110. The updated version of application 122 may be instrumented to provide system 100 with the ability to monitor the execution of the execution scripts, for example, by tracking the execution paths that the updated version of application 122 follows and the outputs of the updated version of application 122. For example, the updated version of application 122 may be brought to any state of interest, such as, for example, a point of failure found in the original version of application 122 (e.g., the point of failure that the updated version of the application is meant to fix), may be monitored for resource consumption, security violations, and other similar application related data that may be relevant to the developer. In some aspects, the updated version of the application 122 may be stored in memory 154 of server 150 and the generated execution scripts may be run on the updated version of application 122 on server 150.

In some aspects, new execution data may be collected during the execution of the execution scripts on the updated version of application 122. The collected new execution data may be compared to the original execution data 124 collected from the end user device 110. For example, the outputs from both the original execution data 124 and new execution data may be compared to determine how an update has affected the software application 110. Based on the comparison, the system may determine whether the goal of the update has been satisfied or whether the update was successful, e.g., does the application still fail at a certain point or has the update remedied the issue, are the outputs and execution paths for the portions of the application 122 that were not meant to be changed the same, or other similar goals. For example, if the original execution data 124 included an error or failed execution path and the new execution data does not include the error or failed execution path, the system may determine that the update was successful.

In some aspects, executing an execution script on server 150 may cause commands to be issued to end user device 110. For example, end user device 110 may receive an updated version of application 122 from server 150 (instrumented or un-instrumented), may instrument the received updated version of application 122 if necessary, and may generate the new execution data for the updated version of the application 122 using the same inputs and environment that were used when the original version of application 122 to generate execution data 124. This allows the updated version of the application 122 to be run on the end user device 110 with the exact same inputs and environment as the previous version to test the updated version based on the real-life data.

Figure 2:
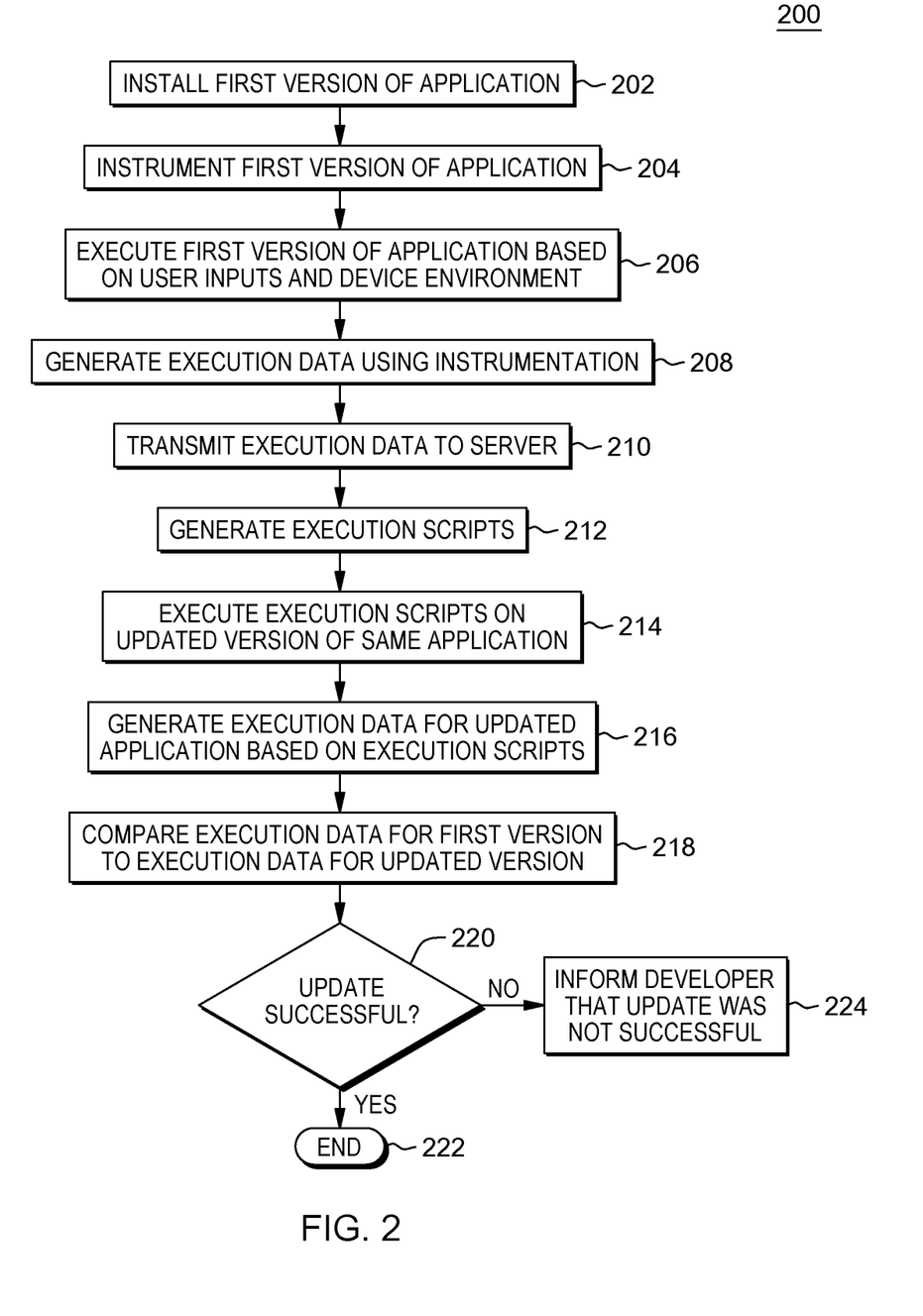
FIG. 2 is a flow chart illustrating an example method of dynamically automating application testing in accordance with an aspect of the present disclosure.

With reference now to FIG. 2, a method 200 is disclosed. At 202, a first version of an application is installed on or provided to a plurality of end user devices 110. For example, server 150 may provide the first version of the application to the end user devices 110. At 204, the first version of the application is instrumented by the end user devices 110. In some aspects, the server 150 may instrument the first version of the application on the end user devices 110. In some aspects, the first version of the application may be provided to the end user devices 110 already including the instrumentation. At 206, end user device 110 executes the first version of the application based on user inputs and a device environment. At 208, end user device 110 generates execution data based on the execution of the first version of the application using the instrumentation. At 210, the execution data is transmitted to server 150. At 212, server 150 generates executions scripts based on the execution data. At 214, the execution scripts are executed on an updated version of the same application to re-run the execution of the first version of the application on the updated version based on the same user inputs and device environment that the first version of the version of the application was executed on. In some aspects, the updated version of the application may be stored on the server 150 and the execution of the executions scripts on the updated version of the application may occur on the server. In some aspects, the updated version of the application may be provided to the end user device 110 and the execution scripts may be executed on the updated version of the application on end user device 110. At 216, execution data is generated based on the execution of the execution scripts on the updated version of the application. At 218, the execution data for the first version of the application may be compared to the execution data for the updated version of the application. At 220, the system determines whether the update is successful based on the comparison. For example, if the execution data for the first version of the application includes an error or failed execution path and the execution data for the updated version does not include the error or failed execution path, the system may determine that the updated version of the application is successful and proceed to 222 to end. As another example, if the execution data for the first version of the application includes the error or failed execution path and the updated version also includes the error or failed execution path, the system may determine that the updated version of the application is not successful and may proceed to 224. As yet another example, if the execution data for the first version of the application does not include an error or failed execution path in a particular part of the first version of the application and the execution data for the updated version includes a new error or failed execution path, the system may determine that the updated version of the application is not successful and may proceed to 224. At 224, the system may inform the developer of the updated version of the application that the update was not successful. For example, the system may transmit the execution data for the first version of the application, the execution data for the updated version of the application, the execution script, and the results of the comparison to the developer to facilitate further updates of the application.

Figure 3:
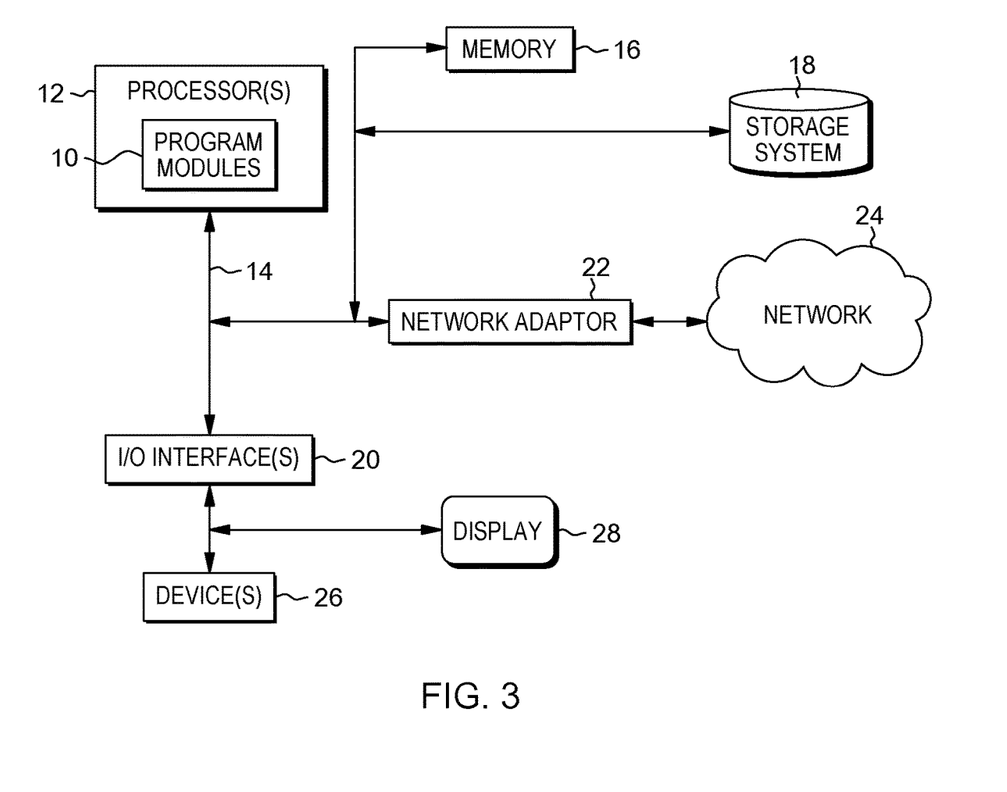
FIG. 3 illustrates a schematic of an example computer or processing system that may implement any component of the system for dynamically automating application testing in accordance with an aspect of the present disclosure.

FIG. 3 illustrates a schematic of an example computer or processing system that may implement any or all of system 100, computing device 110, and server 150. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the system shown in FIG. 1 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of the computer system may include, but are not limited to, one or more processors or processing units 12, a system memory 16, and a bus 14 that couples various system components including system memory 16 to processor 12. The processor 12 may include one or more program modules 10 that perform the methods described herein. The program modules 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method performed by at least one hardware processor, comprising:
    instrumenting a first version of an application on a plurality of end user devices associated with end users of the application, wherein the instrumentation comprises injecting instrumentation into executable code of the first version of the application:
    receiving execution data for the first version of the application from at least some of the plurality of end user devices, the execution data generated by the at least some of the plurality of end user devices, and the execution data is generated based on an execution of the instrumented executable code of the first version of the application by each of the at least some of the end user devices during real-life use of the application by the end users of the at least some of the end user devices;
    automatically generating a plurality of execution scripts based on the received execution data, each execution script configured to reproduce user inputs and user device environment that were used during the real-life execution of the first version of the application by a respective one of the end users devices;
    automatically executing at least some of the plurality of execution scripts to use the reproduced user inputs and user device environments on an execution of executable code of an updated version of the application;
    monitoring the automatic execution of the at least some of the plurality of execution scripts on the executable code of the updated version of the application to identify an execution point of failure in the execution of the executable code of the first version of the application; and
    identifying the execution point of failure from the monitoring by:
        instrumenting the updated version of the application;
        automatically executing the at least some of the plurality of execution scripts on the instrumented executable code of the updated version of the application to use the reproduced user inputs and user device environments that were used during the automatic execution of the executable code of the updated version of the application;
        generating new execution data from the automatic execution of the at least one of the execution scripts on the instrumented executable code of the updated version of the application;
        comparing the received execution data from the execution of the instrumented executable code of the first version of the application to the new execution data from the execution of the instrumented executable code of the updated version of the application;
        determining whether the execution point of failure occurs in the execution of the executable code of the updated version of the application based on the comparing; and
        determining whether the updated version of the application is successful based on whether the execution point of failure occurred in the execution of the executable code of the updated version of the application.

2. The method of claim 1, wherein instrumenting the first version of the application comprises using at least one of a custom class loader and method swizzling.

3. The method of claim 1, wherein the execution data comprises deterministic events.

4. The method of claim 1, wherein the execution data comprises non-deterministic events.

5. The method of claim 1, wherein instrumenting the first version of the application on the plurality of end user devices comprises instrumenting the first version of the application on an arbitrarily large number of end user devices, wherein the arbitrarily large number of end user devices comprises at least five hundred end user devices.

6. A system comprising:
    at least one processor; and
    a memory storing instructions that, when executed by the at least one processor, cause the at least one processor to:
        instrument a first version of an application on a plurality of end user devices associated with end users of the application, wherein the instrumentation comprises injecting instrumentation into executable code of the first version of the application;
        receive execution data for the first version of the application from at least some of the plurality of end user devices, the execution data generated by the at least some of the plurality of end user devices, and the execution data is generated based on an execution of the instrumented executable code of the first version of the application by each of the at least some of the end user devices during real-life use of the application by the end users of the at least some of the end user devices;
        automatically generate a plurality of execution scripts based on the received execution data, each execution script configured to reproduce user inputs and user device environment that were used during the real-life execution of the first version of the application by a respective one of the end users devices;
        automatically execute at least some of the plurality of execution scripts to use the reproduced user inputs and user device environments on an execution of executable code of an updated version of the application;
        monitor the automatic execution of the at least some of the plurality of execution scripts on the executable code of the updated version of the application to identify an execution point of failure in the execution of the executable code of the first version of the application; and
        identify the execution point of failure from the monitoring by:
            instrumenting the updated version of the application;
            automatically executing the at least some of the plurality of execution scripts on the instrumented executable code of the updated version of the application to use the reproduced user inputs and user device environments that were used during the automatic execution of the executable code of the updated version of the application;

generating new execution data from the automatic execution of the at least one of the execution scripts on the instrumented executable code of the updated version of the application;

comparing the received execution data from the execution of the instrumented executable code of the first version of the application to the new execution data from the execution of the instrumented executable code of the updated version of the application;

determining whether the execution point of failure occurs in the execution of the executable code of the updated version of the application based on the comparing; and determining whether the updated version of the application is successful based on whether the execution point of failure occurred in the execution of the executable code of the updated version of the application.

7. The system of claim 6, wherein instrumenting the first version of the application comprises using at least one of a custom class loader and method swizzling.

8. The system of claim 6, wherein the execution data comprises deterministic events.

9. The system of claim 6, wherein the execution data comprises non-deterministic events.

10. An apparatus comprising:
at least one processor; and
memory storing instructions that, when executed by the at least one processor, cause the at least one processor to:
instrument a first version of an application installed on the apparatus, wherein the instrumentation comprises injecting instrumentation into executable code of the first version of the application;

generate first execution data from the first version of the application, the first execution data generated by the instrumentation in response to an execution of the instrumented executable code of the first version of the application by the apparatus;

transmit the first execution data to a server;

receive from the server a plurality of execution scripts, each execution script generated based on respective execution data transmitted to the server from a plurality of end user devices associated with end users of the application, the respective execution data of the plurality of end user devices generated by the plurality of end user devices, and each respective execution data is generated based on an execution of the instrumented executable code of the first version of the application by each of the plurality of end user devices during real-life use of the application by the end users of the at least some of the end user devices, the plurality of execution scripts including an execution script generated based on the first execution data, each execution script configured to reproduce user inputs and user device environment that were used during the real-life execution of the first version of the application by a respective one of the end user devices that generated the execution data;

receive from the server an updated version of the application;

automatically execute at least some of the plurality of execution scripts to use the reproduced user inputs and user device environments on an execution of executable code of the updated version of the application;

monitor the automatic execution of the at least some of the plurality of execution scripts on the executable code of the updated version of the application to identify an execution point of failure in the execution of the executable code of the first version of the application; and identify the execution point of failure from the monitoring by:
instrumenting the updated version of the application;
automatically executing the at least some of the plurality of execution scripts on the instrumented executable code of the updated version of the application to use the reproduced user inputs and user device environments that were used during the automatic execution of the executable code of the updated version of the application;

generating new execution data from the automatic execution of the at least one of the execution scripts on the instrumented executable code of the updated version of the application;

comparing the received execution data from the execution of the instrumented executable code of the first version of the application to the new execution data from the execution of the instrumented executable code of the updated version of the application;

determining whether the execution point of failure occurs in the execution of the executable code of the updated version of the application based on the comparing; and determining whether the updated version of the application is successful based on whether the execution point of failure occurred in the execution of the executable code of the updated version of the application.

11. The apparatus of claim 10, wherein instrumenting the first version of the application comprises using at least one of a custom class loader and method swizzling.

12. The apparatus of claim 10, wherein the execution data comprises deterministic events.

13. The apparatus of claim 10, wherein the execution data comprises non-deterministic events.

* * * * *